INVENTORS.
ELLIOTT R. MARSH
WALTER D. MINNICH
BY
Thomas & Crickenberger

Nov. 19, 1963 E. R. MARSH ET AL 3,111,648

CONVERSION APPARATUS

Filed March 31, 1960 8 Sheets-Sheet 3

Nov. 19, 1963 E. R. MARSH ET AL 3,111,648

CONVERSION APPARATUS

Filed March 31, 1960 8 Sheets-Sheet 5

Nov. 19, 1963 E. R. MARSH ET AL 3,111,648

CONVERSION APPARATUS

Filed March 31, 1960 8 Sheets-Sheet 7

United States Patent Office 3,111,648
Patented Nov. 19, 1963

3,111,648
CONVERSION APPARATUS

Elliott R. Marsh, Endicott, and Walter D. Minnich, Vestal, N.Y., assignors to International Business Machines Corporation, New York, N.Y., a corporation of New York Filed Mar. 31, 1960, Ser. No. 18,895
2 Claims. (Cl. 340—172.5)

This invention relates to code conversion apparatus and more particularly to data processing devices for performing such functions.

Where data processing devices receive information from various types of input and output devices, the problem sometimes arises that the code notation used by one type of input-output device to represent information is incompatible with the code notation employed by one or more of the other input-output devices. It is advantageous therefore for the central processing system to be able to accept data in one type of code notation and convert it to other types of code notation as required by the particular input-output devices employed.

It is a feature of this invention to provide a data processing device capable of converting one type of coded information to another type of coded information.

It is another feature of this invention to provide a code conversion apparatus which may convert a numerical code to an alphamerical code with provision for inserting blanks to the left of the most significant digit of the alphamerical code.

It is a further feature of this invention to provide a code conversion device capable of converting a numerical code to an alphamerical code with provision for retaining in the alphamerical code the sign associated with the numerical code.

It is a still further feature of this invention to provide a code conversion apparatus which may convert an alphamerical code to a numerical code at a very rapid rate.

According to another feature of this invention a novel code conversion apparatus is provided which may convert an alphamerical code to a numerical code and retrieve the sign of the numerical code.

It is another feature of this invention to provide a code conversion device which may convert from one code notation to another information disposed in scattered addresses in a storage medium.

These and other objects of this invention may be more fully appreciated when considered in the light of the following specification and the drawings in which.

Figure 2:
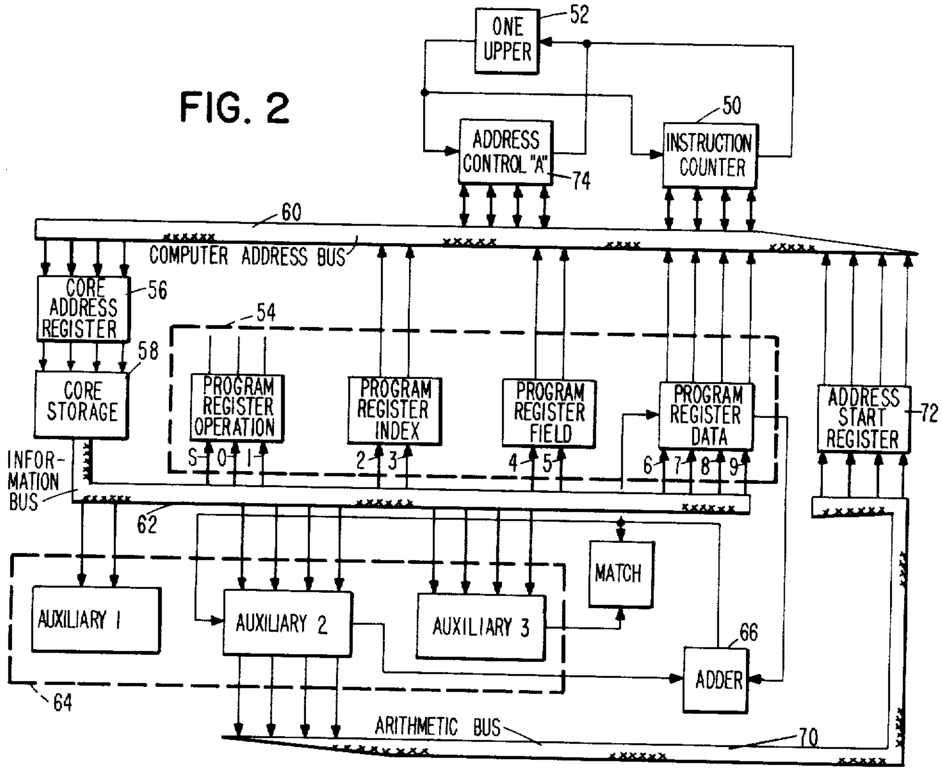
FIG. 2 illustrates in block form the instruction control aspects of a conversion device according to this invention.
Figure 6:
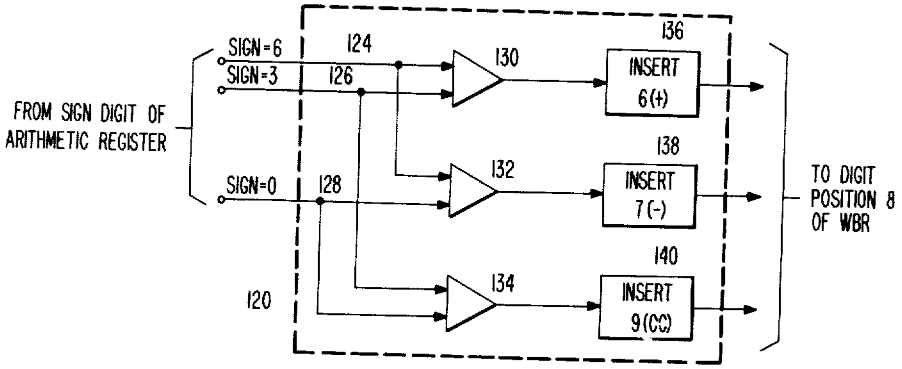
Figure 5:
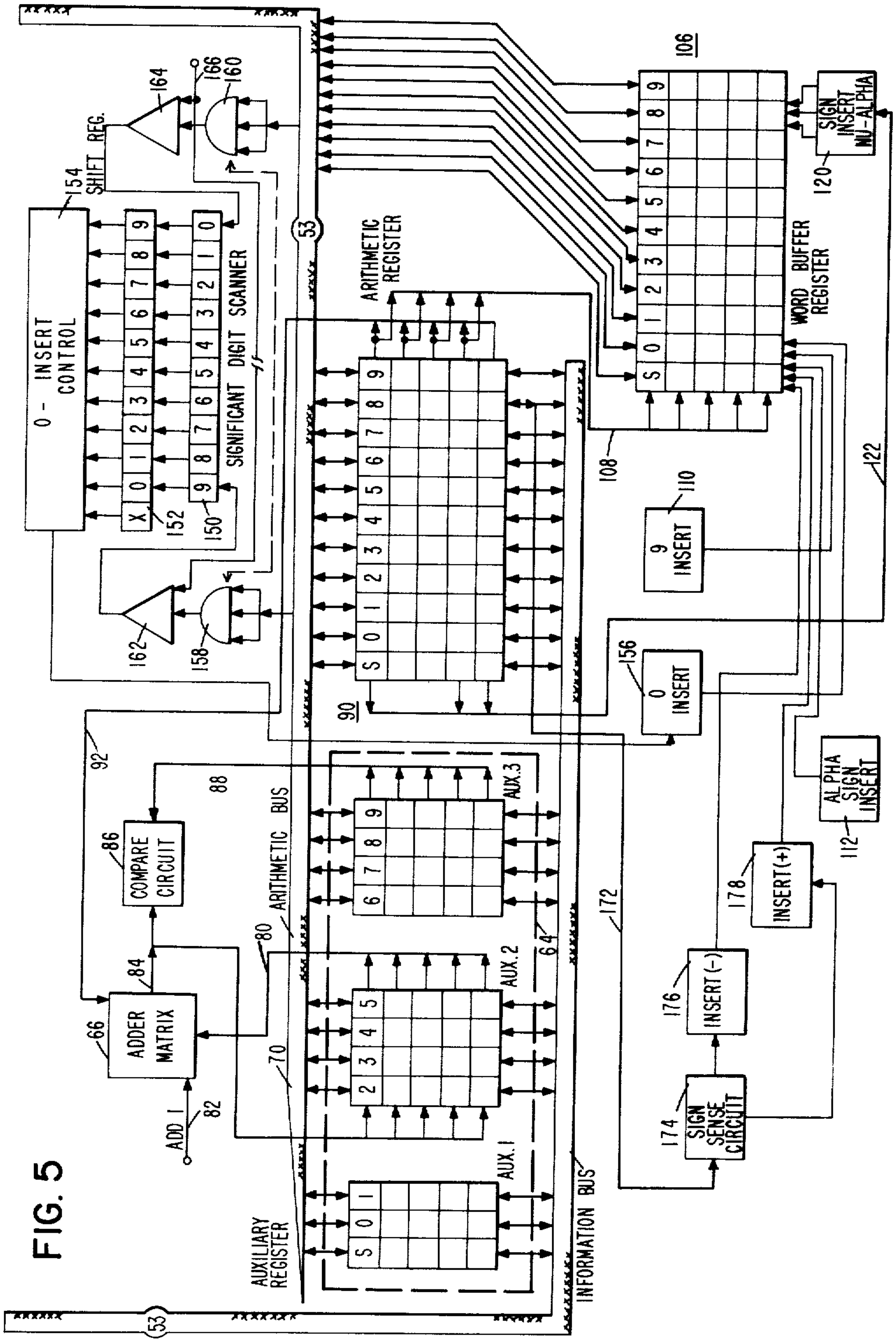
Figure 5A:
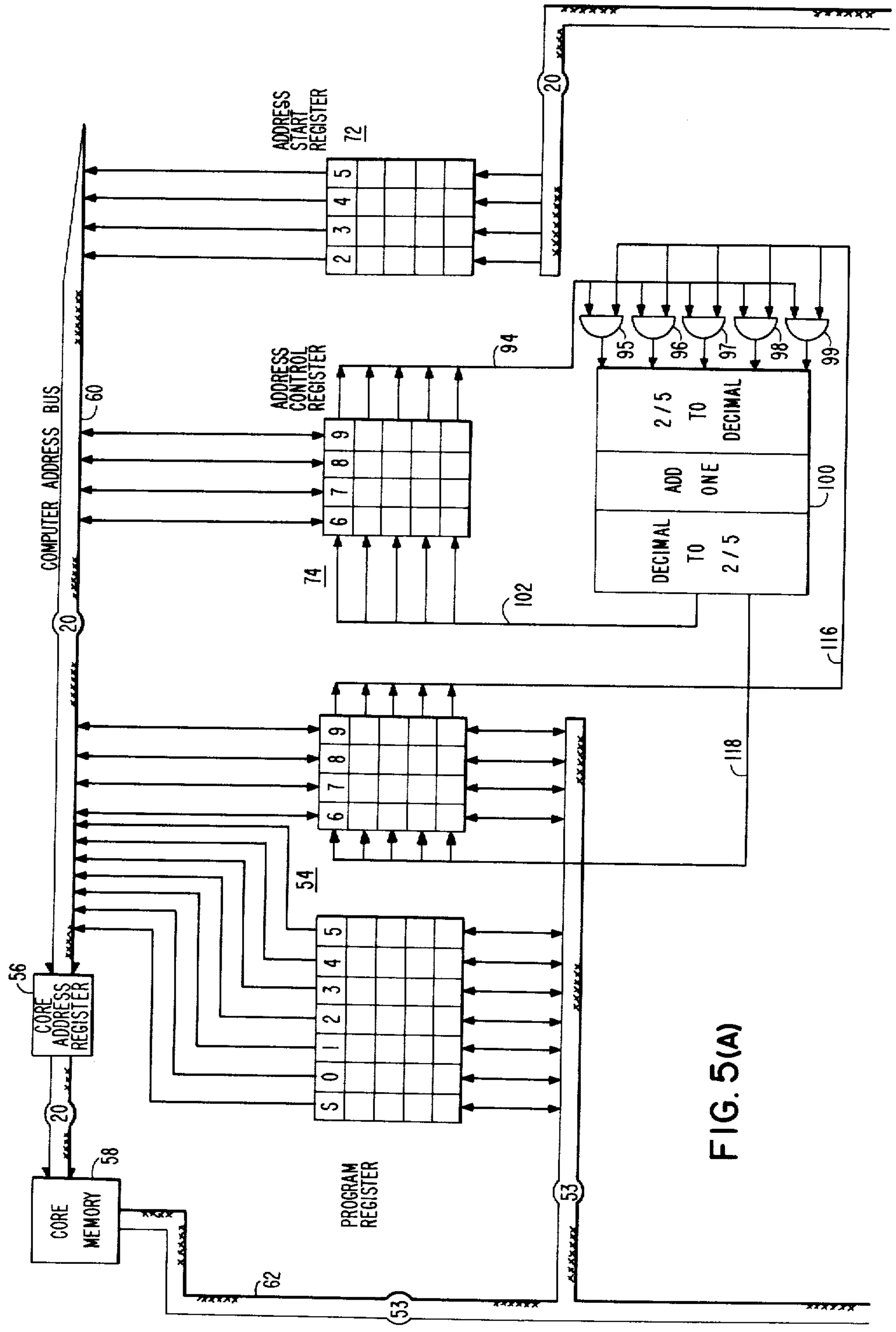

FIGS. 5 and 5*a* illustrate in greater detail a system for performing code conversion operations according to this invention;

FIG. 6 illustrates in detail a sign insert circuit shown in block form in FIG. 5; and FIGS. 7 through 10 illustrate the detailed construction of registers employed in FIGS. 2, 5 and 5*a*.

Figure 1:
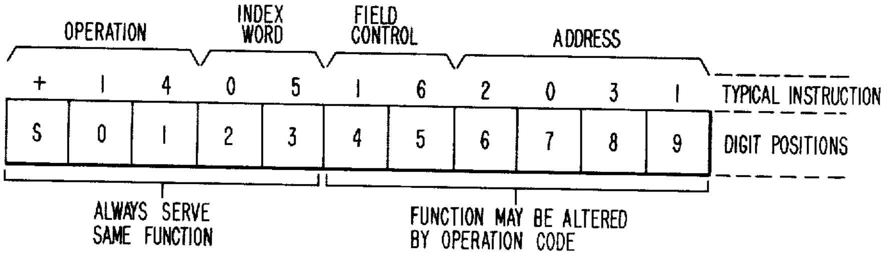
FIG. 1 depicts an instruction word format employed in the apparatus of this invention.

This device relates to a data processing system which performs, among other functions, the function of converting coded data from one type of code representation to another type of code representation. Each operation performed by this processing device is defined by an instruction word. The instruction consists of a 10 position word and sign. As illustrated in FIG. 1, the sign, 0, and 1 positions contain the operation to be performed. Positions 6, 7, 8 and 9 usually refer to the storage locations of the data to be operated on. Positions 4 and 5 are designated field control positions of an instruction word. They may, for example, specify what part of a data word is to be used or operated on. When so employed, position 4 designates the left limit and position 5 the right limit of the portion of the data word. These limits define a field. Positions 4 and 5 are used in data conversion instructions to indicate an address in memory of a word, which in turn contains the address in memory of the first word to be operated on by the data conversion instruction. Positions 2 and 3 of an instruction word contain an index word portion. Before each instruction is performed, the index word (IW) in positions 2 and 3 must be checked. If the index word is 00, the address in positions 6 through 9 is used without alteration thereof. If the index word has any value from 01 to 99, then the word in memory specified by this address is added to the word in positions 6 through 9. All instructions may employ indexing on the address portion.

Each instruction may be considered as having three portions. These portions are the instruction finding, the indexing of a found instruction, and operation on data. Referring to FIG. 2, the instruction finding portion involves the instruction counter (IC) 50, a unit adder 52, a program register 54, a core address register 56, and a core memory 58. The instruction counter 50 has four positions which contain the storage address of the instruction to be found. The end of a previous instruction signals the instruction counter to send its contents over a computer address bus 60 to the core address register 56. The core address register 56 selects the storage location of the instruction word, and this word is transferred to the program register 54 by way of an information bus 62. As the instruction word is transferred, the contents of the instruction counter 50 is serially shifted through the unit adder 52 which increases the four digit value by one and returns it to the instruction counter 50 thus, the instruction counter is prepared to select the next instruction from storage.

The program register 54 is divided by function into four portions. These portions are the operation portion (S, 0, 1), the index portion (2, 3), the field portion (4, 5), and the data address portion (6, 7, 8, 9). When the instruction word is placed in the program register 54, the index portion is examined to determine whether an indexing operation should follow. If the index register portion contains 00, an index word storage location is not specified, and the index operation is skipped. Any index register value from 01 through 99 signals the data processing device to perform an index operation. The bits in the units and tens positions of a storage address are transferred from the index register portion of the program register 54 to the core address register 56. Zeros are inserted in the hundreds and thousands positions to give a selected storage address between 0001 and 0099. The selected index word is transferred from the core storage 58 to an auxiliary register 64. The contents of auxiliary register 2 are added to the word in positions 6 through 9 of the program register. This addition takes place in an adder 66, and the sum is returned to positions 6 through 9 of the program register. This addition takes place serially, and its completion is the end of an index operation.

An operation on data may not take place until the contents of the program register D, positions 6 through 9 of the program register 54, are transferred to the core address register 56, and the data stored at this address in the core storage 58 is read out on the information bus 62. This information is routed to a register designated by the operation in process, and manipulations thereon take place according to the instruction being executed.

Figure 3:
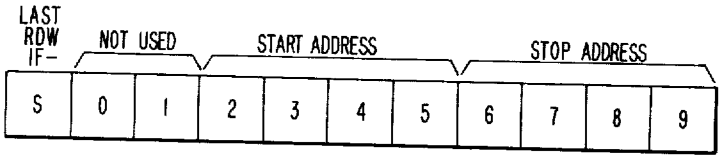
FIG. 3 illustrates the format of a record definition word employed to execute an instruction on various blocks of information widely scattered in a memory device.

In certain types of operations it is desirable to extract from or store in memory a block of words. For this purpose instructions may operate on data stored in one block of addresses in memory, then proceed to operate on data stored as a block in another portion of memory, and then operate on a further block of data words stored in a further portion of memory and so forth. Such processing may be referred to as scatter read or write operations. Such scatter read or write operations are controlled by an instruction which performs in the manner indicated with respect to the description of FIG. 2. However, a scatter read-write instruction requires a second instruction word, termed a record definition word (RDW), which is depicted in FIG. 3 as having the start address in digit positions 2 through 5 and the stop address in digit positions 6 through 9.

The record definition word specifies by the start address the first address of a block of words in memory to which or from which information is transferred. The stop address indicates the last address in memory of the block of information words. There is one record definition word for each block of information in memory. Each record definition word has a plus or minus sign. The last record definition word in a series of record definition words has a minus sign which indicates that such record definition word is the last one. When the start and stop addresses of a negative record definition word become equal, the instruction is concluded. If an instruction involving scatter read-write operation is to operate on three blocks of data in memory, three record definition words are employed. The sign of the first two record definition words is positive, while the sign of the last record definition word is negative. The instruction involved commences operating on the block of data defined by the start address of the first record definition word and continues until the stop address is reached. The start address defined by positions 2 through 5 in FIG. 3 is stored in the auxiliary register 2 in FIG. 2, whereas the stop address indicated in positions 6 through 9 of FIG. 3 is stored in the auxiliary register 3. The start address in the auxiliary register 2 is incremented with each operation and is compared with the stop address in auxiliary register 3. As long as these two registers are unequal, the processing continues.

As soon as the start address in auxiliary 2 equals the stop address in auxiliary 3, the block of information defined by the current record definition word has been completed. At this point the next record definition word is brought from the core storage 58 in FIG. 2 and placed in the auxiliary register 64. Operation on the second block of data continues until the start address in auxiliary 2 equals the stop address in auxiliary 3. When such an equality is reached the sign of the record definition word in auxiliary 1 is sampled, and if it is plus the next auxiliary word is brought in. In the assumed illustration the second record definition word has a plus sign since there is still another record definition word involved. Accordingly, the third record definition word is brought from the core storage 58 to the auxiliary register 64 and processing continues until the start address thereof equals the stop address. At this point the sign is examined in auxiliary register 1, and since this is the last record definition word of the three involved, its sign is negative and the scatter read-write operation is terminated. The instruction counter 50 in FIG. 2 is used at this point to bring in the next instruction from the core storage 58 to the program register 54, and the program continues on the next instruction. This scatter read or write type of operation lends itself well to instructions which convert data represented by one code in memory to data represented by another code returned to memory.

Figure 4:
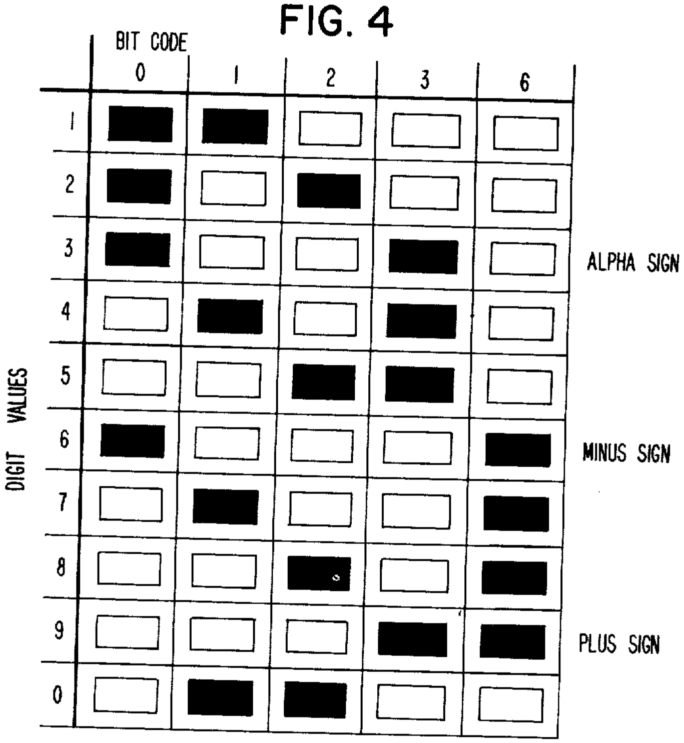
FIG. 4 shows a two-out-of-five fixed-count code which is used in the apparatus of this invention.

In a preferred arrangement according to this invention, a two-out-of-five fixed-count code is employed. This code is illustrated in FIG. 4 with black squares representing one binary value and the non-black squares representing another binary value. The black squares may be arbitrarily designated as binary one and the non-black squares as binary zero. The decimal values 1 through 9 and 0 are represented by the rows in FIG. 4, and the value assigned to each position within a five bit code is indicated by the numbers at the top of FIG. 4. For example, the decimal value of 1 is represented by the row at the top of FIG. 4 as having a binary one in the 0 position, a binary one in the 1 position and binary zeros in positions 2, 3 and 6. The decimal value of 2 is represented in this five bit code as having a binary one in the 0 and the 2 positions and a binary zero in the 1, 3 and 6 positions. The remaining decimal values may be readily determined by inspection.

As indicated in FIG. 4, the decimal value of 3 is an alpha sign, the decimal value of 6 is a minus sign and the decimal value of 9 is a plus sign. These decimal values carry the significance of a plus or minus sign or an alpha sign whenever they are disposed in the sign position of a word. When disposed in any position but the sign, the decimal values of 3, 6 or 9 carry their ordinary significance. When a word carries an alpha sign, this indicates that the word represents an alphabetic character and not a number. When a word represents a number, the sign position carries a 6 or 9 depending upon whether the sign is minus or plus.

An alphabetic character or a number may be represented by two digits each of which contains five characters. The five characters of each digit employ a two-out-of-five fixed-count code system of notation. A code which represents letters of the alphabet or numbers is herein referred to as an alphamerical code. The first of two digits representing an alphamerical character is 6, 7, 8 or 9 as illustrated in Table I.

*Table I*

| Alphamerical | | Alphamerical | | Alphamerical | |
|---|---|---|---|---|---|
| Character | Code | Character | Code | Character | Code |
| A | 61 | M | 74 | Y | 88 |
| B | 62 | N | 75 | Z | 89 |
| C | 63 | O | 76 | 0 | 90 |
| D | 64 | P | 77 | 1 | 91 |
| E | 65 | Q | 78 | 2 | 92 |
| F | 66 | R | 79 | 3 | 93 |
| G | 67 | S | 82 | 4 | 94 |
| H | 68 | T | 83 | 5 | 95 |
| I | 69 | U | 84 | 6 | 96 |
| J | 71 | V | 85 | 7 | 97 |
| K | 72 | W | 86 | 8 | 98 |
| L | 73 | X | 87 | 9 | 99 |
| | | | | Blank | 00 |

Special characters may be represented by other two digit codes if desired. A complete word in the apparatus herein described has ten digits of five bits each and a sign digit of three bits. The sign digit is normally disposed on the left and the highest order digit is adjacent the sign digit.

If the sign of a full word is plus or minus, this indicates that the word is a number having as many as ten digits though it may be less than ten digits. If an alpha sign is associated with a full word, this indicates that an alphamerical character, a letter or a number or both may be contained therein, and the maximum number of such characters in one full word is five since it takes two digit positions to represent one alphamerical character. It is pointed out that a number may be represented by a number word or an alphamerical word. When a word is purely numbers, its sign is indicated by the sign digit. The sign of a number represented in the alphameric code may, if desired, be preserved according to this invention by inserting it in a predetermined digit position of an alphamerical word. The position arbitrarily selected for storing such a sign herein is the next to the highest order digit. The sign can be stored in this position without the loss of information since this position carries a nine when a number is represented in the alphamerical code as shown in Table I above. Thus the sign of a number may be retrieved when a number is converted from the alphamerical representation in Table I to the numerical representation in FIG. 4.

In Table I a blank is represented by zeros in each of two digit positions. It is sometimes desirable to insert blanks in an alphameric word to the left of the most significant alphameric number or character. For example, blanks may be employed to inhibit some printout devices from printing zeros to the left of the most significant digit of a number or character where an alphameric code is employed. In some instances it is necessary to edit numerical data and convert to alphameric data. Such an editing operation involves an instruction and one or more record definition words as explained with reference to FIG. 2. The manner in which this type of operation is performed is next explained with reference to FIG. 5.

Referring to FIG. 5, a data processing arrangement according to this invention is illustrated in detail. Some of the components in FIG. 5 correspond to some of the components in FIG. 2, and such components are labelled with the same reference numeral. When an edit numerical-to-alpha instruction is read from the core memory 58 in FIG. 5, it is stored in the program register 54. In such an instruction word the sign digit and the zero and one digits indicate that the instruction involves a conversion of numerical data to alpha-merical data. Let it be assumed for purposes of illustration that this instruction is not to be indexed. Thus, digit positions 2 and 3 both hold zeros. The field control information in digit positions 4 and 5 indicate an address in memory which is less than 100. The core address register 56 responds to the data in digit positions 4 and 5 of the program register 54 and reads a ten digit word plus sign from the core memory 58 into the auxiliary register 64. This word is conveyed from the core memory 58 to the auxiliary register 64 on the information bus 62. That portion of the word stored in auxiliary register 2 (digit positions 2 through 5) is transferred along an arithmetic bus 70 to an address start register 72. The information stored in the address start register (ASR) is a number which represents the address in memory of the first word to be converted from numerical to alphamerical data. The information in digit positions 6 through 9 of the program register 54 is transferred along the computer address bus 60 to an address control register 74. The information in the address control register 74 is a number which indicates the address in memory where the first record definition word is stored. The information in the address start register 72 is transferred along the computer address bus 60 to digit positions 6 through 9 of the program register 54. The information stored in this portion of the program register is a number which indicates an address in memory from which the first numerical word is to be read. In case a block of words is to be read from memory, this address signifies the first address of such block.

At this point the information in the address control register 74 is applied to the core address register 56 which in turn causes the core memory 58 to read out a record definition word which is conveyed along the information bus 62 to the auxiliary register 64. The information in the auxiliary register 2 represents the starting address of the first word in memory to be converted from numerical to alphamerical data and should then be equal to the information stored in the address start register 72 since each of these storage devices contain the address of the first word in memory to be converted. This starting address is conveyed from auxiliary register 2 along the arithmetic bus 70 to the address start register 72. For a detailed description of one type of adder matrix which may be employed, reference is made to Patent No. 2,967,-665, filed on Aug. 19, 1957, and assigned to the assignee of the present invention.

At this point the address control register 74 is read out column by column on a cable 94 and supplied through OR circuits 95 through 99 to an add-one circuit 100. The add-one circuit includes a converter which translates two-out-of-five coded data to the decimal representation, increments the decimal value by one, and converts the decimal back to the two-out-of-five system of notation. The output from the add-one circuit 100 is applied on a cable 102 back to the address control register 74. At the end of this operation, the content of the address control register is increased by one, and this value represents the address in memory of the next record definition word.

The information held in digit positions 6 through 9 of the program register is read out on the computer address bus to the core address register 56 which in turn reads from the memory 58 onto the information bus 62 the first numerical word to be converted to alphamerical data. This word is stored in the arithmetic register 90. The left half of the word stored in the arithmetic register 90 is converted from numerical to alphamerical data in a word buffer register 106. Digit position 4 of the arithmetic register is read out to a cable 108 and inserted in the zero digit position of the word buffer register 106. The word buffer register is shifted one position to the right, and a 9-insert circuit 110 inserts a 9 in the zero digit bits of the word buffer register. The word buffer register 106 is again shifted one position to the right, leaving the zero digit position empty.

At this point the bits of digit position 3 of the arithmetic register 90 are read out on the cable 108 and stored in the zero digit position of the word buffer register 106. Again the word buffer register is shifted one position to the right. The 9-insert circuit 110 inserts a 9 in the zero digit bits of the word buffer register 106, and this register is again shifted one position to the right. Next, the two digit position of the arithmetic register is read out and stored in the zero digit position of the word buffer register. This register is shifted one position, and the 9-insert circuit is energized to insert a 9 in the zero position of the word buffer register. The word buffer register is again shifted one position to the right. The one digit position of the arithmetic register is transferred to the zero digit position of the word buffer register. The word buffer register is shifted one position to the right and the 9-insert circuit 110 inserts a 9 in the zero digit position. The word buffer register is shifted one position to the right, and the zero digit position of the arithmetic register 90 is transferred to the zero digit position of the word buffer register. Again the word buffer register is shifted one position to the right, and the 9-insert circuit 110 inserts a 9 in the zero digit position and the word buffer register is full except for the sign digit. An alpha sign insert circuit 112 is operated to insert an alpha sign in the sign digit of the word buffer register. The sign digit uses only the 0, 3, and 6 bits. An alpha sign is indicated by a one in the zero and three bits of the sign digit. It is pointed out that a minus sign is indicated by ones in the zero and six bits, and a plus sign is represented by ones in the three and six bits of a sign digit. After the alpha sign is inserted in the word buffer register 106, the content of this register is transferred by parallel read operation along the arithmetic bus 70 to the arithmetic register 90.

While the arithmetic register and the word buffer register are being manipulated to convert one-half of a numerical word to an alphamerical word, the starting address in the auxiliary register 2 is increased by one and the incremented value is compared with the value in the auxiliary register 3. This is accomplished by serially reading out the columns 5, 4, 3 and 2 of the auxiliary register 2 along a cable 80 to the adder 66 and forcing a carry by energizing the add-one line 82. The output of the adder appears on a cable 84 and is conveyed to a compare circuit 86 and back to the auxiliary register 2. The content of the auxiliary register 3 is supplied on a cable 88 to the compare circuit 86 simultaneously as the incremented value of the auxiliary register 2 is supplied to the compare circuit 86. The two values are compared to determine if the content of auxiliary register 2 is equal to or less than the content of the auxiliary register 3. If the content of the auxiliary register 2 is less than the content of the auxiliary register 3, the numerical to alphamerical conversion takes place. The adder matrix 66 may be supplied with data from an arithmetic register 90 along a cable 92. However, when the content of the auxiliary register 2 is being increased by one, information in the arithmetic register 90 is not supplied along the cable 92 to the adder 66. The adder 66 includes provision for converting two-out-of-five code supplied to its inputs to a decimal representation, and when the decimal values are added, the result is converted back to the two-out-of-five code and supplied to the cable 84. The value in the auxiliary register 2 should be less than the value in the auxiliary register 3, and assuming such to be the case, this conversion operation continues.

The first alphamerical word held in the word buffer register 106 is read out in parallel to the arithmetic bus 70 and stored in the arithmetic register 90. This word is now read out from the arithmetic register 90 to the information bus 62 and stored in the memory 58 at the address represented by the address start register 72. At this time the content of the auxiliary register 2 is transferred on the arithmetic bus 70 to the address start register 72.

At this point only one-half of the numerical word involved has been converted to an alphamerical word. Accordingly, the content of digit positions 6 through 9 of the program register is again supplied to the core address register 56 which in turn causes the memory 58 to read out again onto the information bus 62 the same numerical word which was earlier read out. This word is transferred in parallel to the arithmetic register 90. Digit positions 9, 8, 7, 6 and 5 of the arithmetic register are serially shifted into the word buffer register 106 along the cable 108 with nines being inserted to the left of each of the arithmetic register digit positions to form a ten digit number as explained above. An alpha sign is inserted in the sign digit position by the alpha sign insert circuit 112. The alphamerical word in the word buffer register is transferred in parallel along the arithmetic bus 70 to the arithmetic register 90, and this word is again read out on the information bus 62 and stored in memory at an address indicated by the address start register 72. The start address in auxiliary register 2 is increased by 1 and compared with the stop address in auxiliary register 3. At this time the information held in digit positions 6 or 9 of the program register is increased by 1 by transferring these digits in serial fashion through the ADD circuit 100 on a cable 116. Information on the cable 116 as coupled through the OR circuits 95 through 99 to the add-one circuit, and the incremented output from the add-one circuit is supplied on a cable 118 back to the digit positions 6 through 9 of the program register 54. The information in this portion of the program register represents the address in memory of the next numerical word to be converted. If the incremented address in the auxiliary register 2 is found to be equal to the stop address in the auxiliary register 3 at this time, then an error in the record definition word exists because an odd number of storage addresses has been indicated by the record definition word. A correct record definition word must specify an even number of storage addresses since each numerical word requires two storage addresses when both halves are converted, yielding two alphamerical words. Assuming however that the content of the auxiliary register 2 is less than the content of the auxiliary register 3, the convert instruction continues. Accordingly, the incremented value in the auxiliary register 2 is transferred in parallel along the arithmetic bus 70 to the address start register 72.

The next numerical word is read from an address in memory specified by the digit positions 6 through 9 of the program register 54. This word is conveyed from memory on the information bus 62 to the arithmetic register 90. The numerical word in the arithmetic register is converted to an alphamerical word as explained above. During the period when the first half of the numerical word is being converted to an alphamerical word, the content of the auxiliary register 2 is incremented and compared with the content of the auxiliary register 3. If the two values are found to be equal, the conversion operation of the numerical word continues until the second alphamerical word has been completed and stored in memory. At this time the sign of the record definition word held in the sign stage of the auxiliary register 64 is examined. If the sign is positive, another record definition word is brought from memory to the auxiliary register and further numerical-to-alphamerical operations occur. At some point in time a compare operation of the incremented auxiliary register 2 with the auxiliary register 3 would yield a condition of equality during the period when the first half of a numerical word is being converted to an alphamerical word. When such an equality exists and the sign of the record definition word held in the sign digit of the auxiliary register 64 is minus, then the convert instruction will be terminated as soon as the second half of the numerical word being processed is converted to an alphamerical word. In essence this condition terminates the numerical-to-alphamerical instruction, and the program proceeds to the next instruction.

In some instances it is desirable when converting numerical data to alphamerical data to be able to retain the sign of the numerical word in the newly constructed alphamerical word. An instruction for accomplishing this type of conversion may be termed numerical to alphamerical with sign control. An instruction of this sort operates in the same way as the added numerical-to-alphamerical instruction described in detail above with the exception that digit position 8 of the second alphamerical word is reserved as a sign storage position for the word being converted. If the word being converted has a minus sign, the value 7 is inserted into digit position 8, and if the sign of the word being converted is positive, the value 6 is stored in the digit position 8. For example, if the word −12345 67890 is being converted, it becomes two words as follows: α 9192939495 and α 9697989970. The alpha sign before the last two words indicates the information is represented alphamerically. The 7 in the eighth digit position of the second word, the second digit from the right, indicates that the sign of the word which was converted is minus. If alphabetic words are included in the words to be converted, then the sign stored in the eighth position of the second word may be a 9 which indicates that an alphabetic word was converted to an alphamerical word. For example, the word α 6162636465 may be converted in which case it becomes two words as follows: α 9691969296 and α 9396949695. The 9 in the eighth position of the second word indicates that the converted word was an alphabetic word.

The sign for the eighth digit of the second word is determined by a sign insert circuit 120 when a numerical-to-alphamerical with sign control instruction is being carried out. The sign insert circuit 120 receives information held in the sign digit position of the arithmetic register along a three conductor cable 122. The sign insert circuit 120 converts the sign from the arithmetic register to a value of 6, 7 or 9 and inserts this value in the eighth digit position of the word buffer register. It is pointed out that as the digits of the arithmetic register are shifted to the 0 position of the word buffer register during this convert operation, the 9-insert circuit is not operated when the information in the eighth digit position of the word buffer register passes through the 0 digit position. At this time the sign insert circuit 120 may be operated to insert the proper sign in the eighth digit position of the word buffer register. For subsequent shift operations the 9-insert circuit 110 is operated to insert 9's to the left of each digit.

The manner in which the sign insert circuit 120 may be operated to insert the proper sign in digit position 8 of the word buffer register may be understood by referring to FIG. 6. Signals representative of the sign from the sign position of the arithmetic register are applied on lines 124, 126 and 128 to AND circuits 130, 132 and 134 as shown. If the AND circuit 130 is operated, it means that the sign of the word being converted is plus, and a 6 must be inserted in the digit 8 posiiton of the word buffer register 106. If the AND circuit 132 is operated, this indicates that the sign of the word being converted is minus and a 7 must be inserted in digit position 8 of the word buffer register. On the other hand, if the AND circuit 134 is operated, this signifies that the sign of the word being converted is an alpha sign, and a 9 must be inserted in digit position 8 of the word buffer register. The values 6, 7, or 9 are inserted in the bits of digit position 8 of the word buffer register and the two-out-of-five system of binary representation. The AND circuits 130, 132 and 134 operate respective insert circuits 136, 138 and 140 to insure that the proper sign is inserted in the digit position 8 of the word buffer register. Once the word buffer register is full, the alphamerical word in the word buffer register is transferred to the memory 58 and further processing may continue in the manner previously explained with respect to the numerical-to-alphamerical convert instruction.

In some cases it is desirable to insert blanks to the left of the most significant digit when converting from numerical data to alphamerical data. An instruction for accomplishing this may be designated as edit numerical to alphamerical with blank insertion. This instruction operates in the same way as the edit numerical-to-alphamerical instruction with the exception that zeros, instead of nines, are inserted in even digit positions (0, 2, 4, 6, 8) to the left of each leading zero from the numerical word being converted. Thus, blank alphamerical characters (00) appear to the left of the most significant digit in the resulting alphamerical word. For example, the word +00002 57841 becomes $\alpha$ 0000000092 and $\alpha$ 9597989491.

This instruction is another type of the scatter read or write instructions described earlier, and it differs from the numerical to alphamerical instruction in that it employs a significant digit scanner 150, a zero insert control 154 and a zero insert circuit 156. Information in the 0, 3 and 6 bits in each of the digit positions 0 through 9 of the arithmetic register are transferred to OR circuits coupled to the significant digit scanner 150. Only two of such OR circuits 158 and 160 are shown. The OR circuit 158 receives the 0, 3 and 6 bit lines from the zero digit position of the arithmetic register; while the OR circuit 160 receives the 0, 3 and 6 bit lines of the 9 digit position of the arithmetic register. If the two-out-of-five code representation for the zero value is inspected in FIG. 4, it is readily seen that if a signal occurs on the 0, 3 or 6 bit lines representing a binary one, such digit position cannot hold a zero. Accordingly, a signal supplied through the OR circuit 158 and an AND circuit 162 to the ninth position of the significant digit scanner 150 indicates a significant digit is located in the 0 digit position of the arithmetic register. The significant digit scanner has ten stages of binary elements which may be set to the one or zero state. A signal from the AND circuit 162 sets the ninth position to the one state. If no signal is received from the AND circuit 162, the ninth position remains in the zero state. Accordingly, a zero in the ninth position of the scanner 150 indicates that the zero digit position of the arithmetic register 90 holds a zero. In like fashion the remaining stages 0 through 8 of the significant digit scanner 150 are set to one or zero depending upon whether the corresponding column or digit of the arithmetic register is zero or greater than zero. If a signal is applied through the OR circuit 160 and an AND circuit 164, it sets the 0 position of the significant digit scanner to the one state. The AND circuits 162 and 164 are conditioned by a line 166 which serves to prevent reading of information from the arithmetic register when such a transfer is not desired. It is seen, therefore, that the information held in the significant digit scanner 150 indicates where the most significant digit lies in the arithmetic register. For a more detailed description of a significant digit scanning device, reference is made to Patent 3,067,335, filed on Dec. 30, 1959, and assigned to the assignee of the present invention. The significant digit scanner serves as a temporary storage, and the information is immediately transferred to the shift register 152. From here information may be transferred to the 0-insert control circuit 154 in parallel. This circuit determines where the most significant digit is located in the arithmetic register and manipulates the 0-insert circuit 156. As information is shifted from the arithmetic register to the 0 position of the word buffer register, a 0 is inserted to the left of each insignificant 0 by the 0-insert circuit 156. A 9 is inserted to the left of all significant digits by the 9-insert circuit 110. When the word buffer register is full, the alpha sign circuit 112 is operated to insert an alpha sign in the sign digit of the word buffer register. At this point the full word in the word buffer register is transferred to memory, and the convert instruction continues in like fashion on the second half of the word being converted. A series of record definition words may be employed as explained with reference to the instruction for converting numerical to alphamerical data.

In some cases it is necessary to convert alphamerical data to numerical data. Alphamerical words are gathered from scattered locations in core storage under control of record definition words. Two consecutive alphamerical words become a single numerical word. Alpha or plus signs are translated as +; minus signs are translated as −; and blanks are translated as 0. For example, 0000949792 and 9197909063 become +00472 17003. An instruction for performing such operations may be designated an edit alphamerical to numerical instruction. The data flow for the alphamerical to numerical instruction is the same as that of the numerical to alphamerical instruction. Data is brought from the memory to the arithmetic register, shifted into the word buffer register, and the converted data is brought from the word buffer register to the arithmetic register, then to storage. The record definition words function in the same manner for this as well as the other instructions.

For purposes of illustration, let it be assumed that data to be converted from alphamerical to numerical has been transferred from memory to the arithmetic register. For the first of the two alpha words, positions 1, 3, 5, 7 and 9 of the arithmetic register are serially shifted left through position 9 into the word buffer register. Positions 0, 2, 4, 6 and 8 are ignored. For the second of the two alpha words positions 1, 3, 5, 7 and 9 are serially shifted left through position 9 of the word buffer register. Positions 0, 2, 4 and 6 are ignored. The sign stored in digit position 8 of the arithmetic register is sensed by a sign sense circuit 174. If the sign digit holds a value of 7, an insert minus sign circuit 176 is operated to insert a minus sign in the sign position of the word buffer register. If the sign sense circuit 174 detects that the value held in the 8 digit position of the arithmetic register is any value other than 7, then the insert plus sign circuit 178 is operated to insert a plus sign in the sign position of the word buffer register. The content of the word buffer register is moved to the arithmetic register, and from here it is transferred to storage. Other alphamerical words may be converted to numerical words in like fashion until the current instruction is completed.

Figure 7:
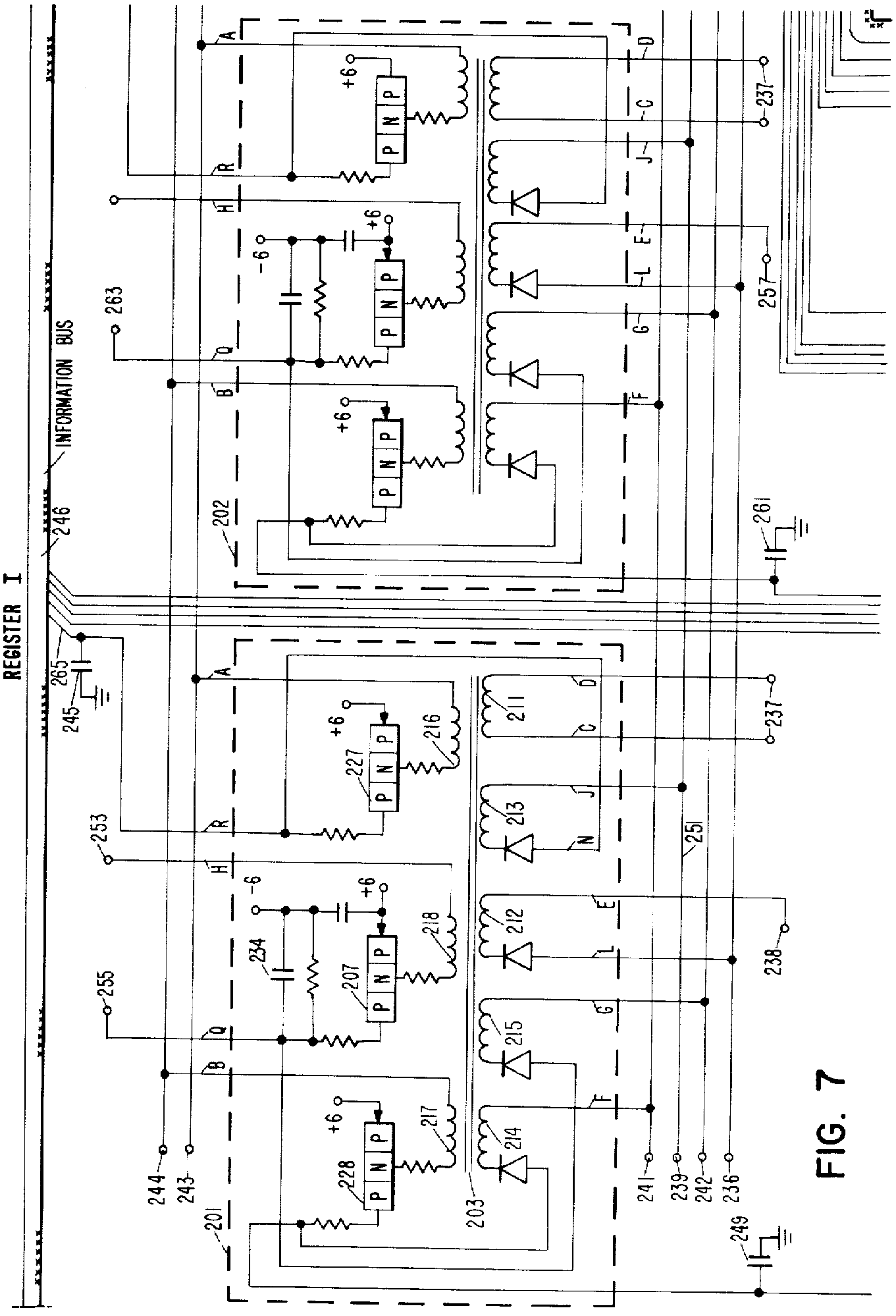
Figure 8:
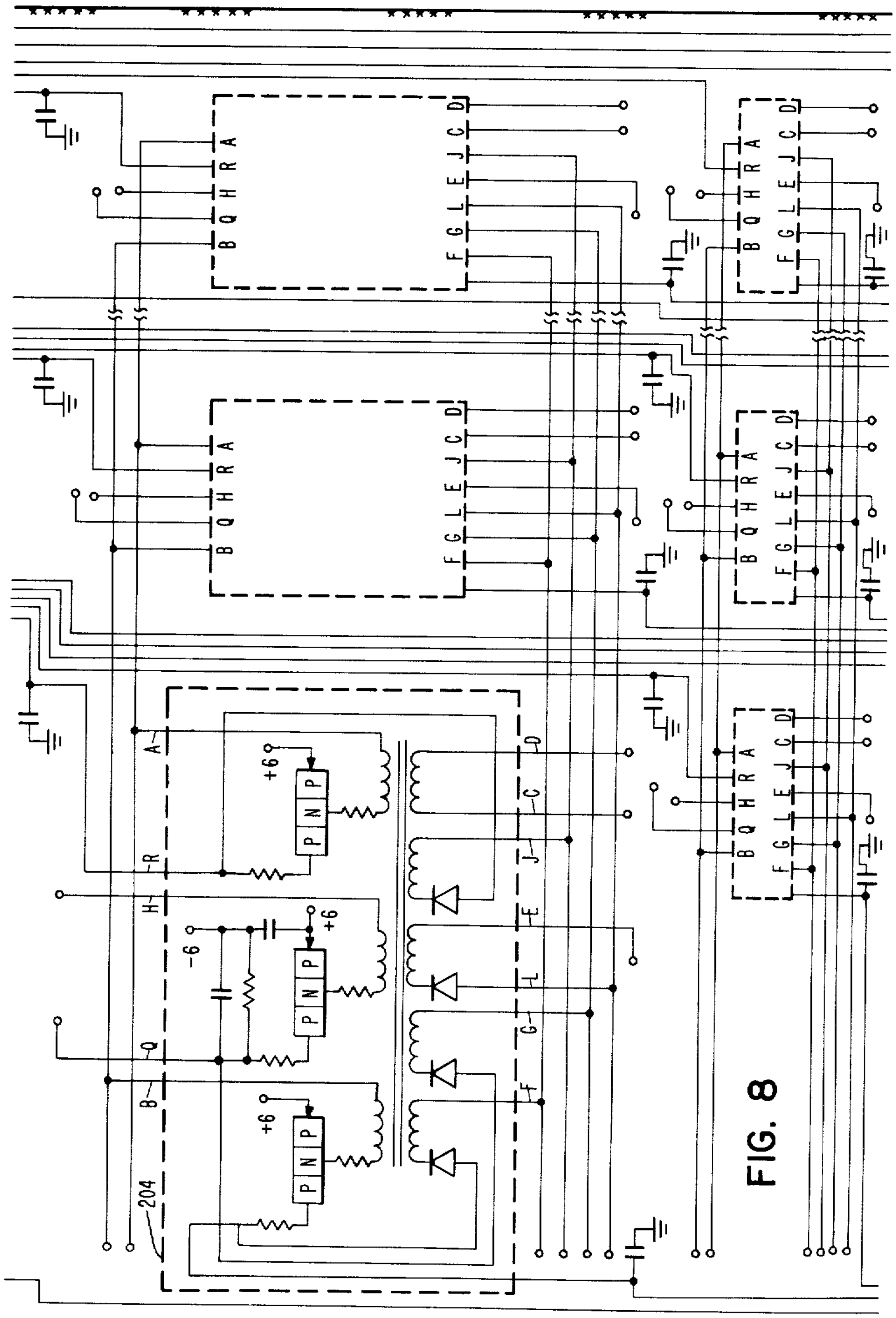
Figure 9:
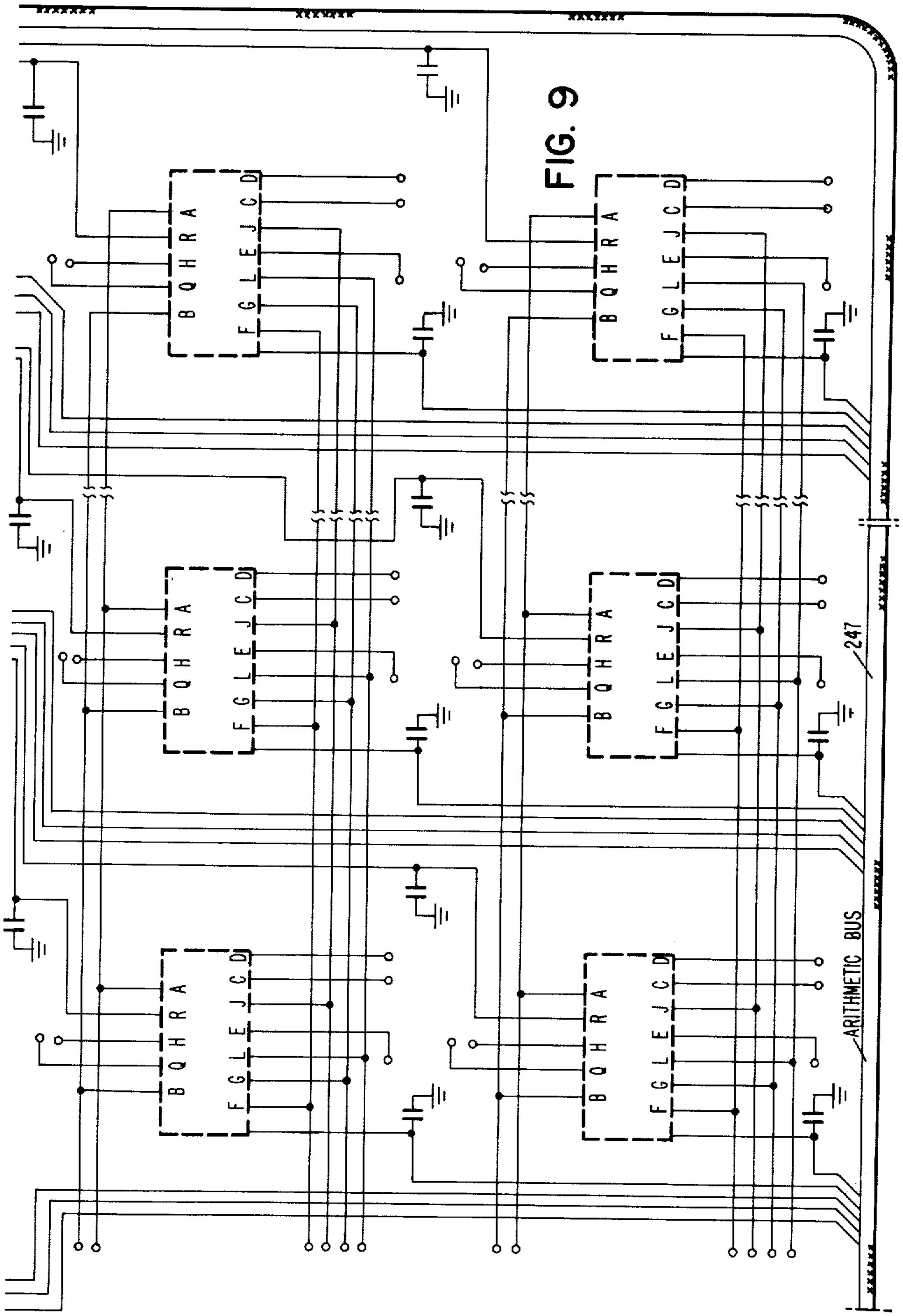
Figure 10:
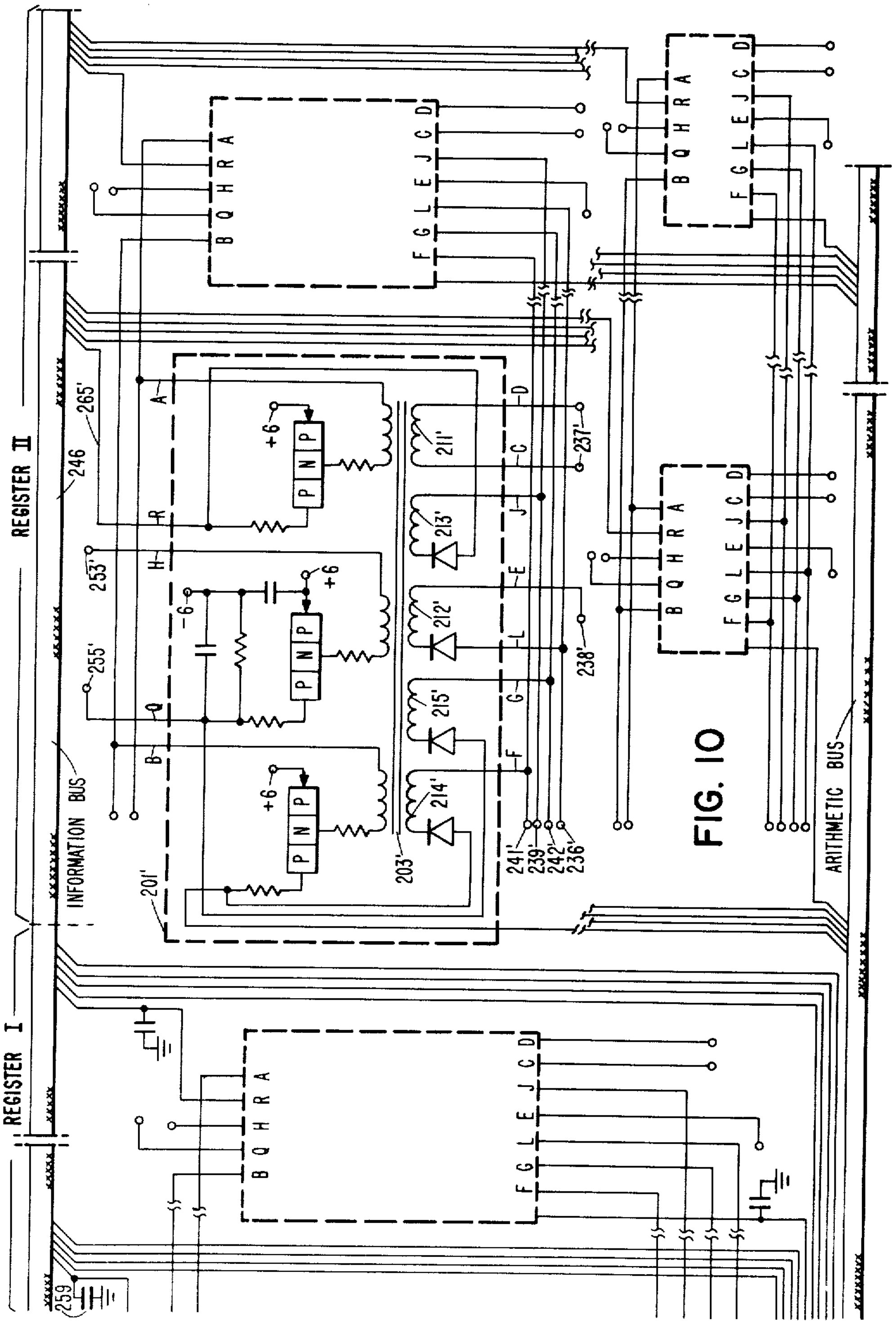

FIGS. 7, 8, 9 and 10 show in some detail the construction of portions of two registers, labelled register I and register II. The register I may be the arithmetic register 90 shown in FIG. 5, and the register II may be the auxiliary register 3. Referring now to FIG. 7, which shows two bits of register I, the numeral 201 indicates a bit located in the top row of the 0 digit column, while the numeral 202 indicates a bit located in the top row of the 1 digit column. The bit 201 is shown as having a core 203 made of a material having substantial magnetic retentivity, and thus exhibits a bistable characteristic. By setting the core 203 in one of its stable conditions, information may be stored therein. This information may then be transferred to a corresponding bit in another register, or it may be read out of the bit, both operations occurring when the core is driven toward its original stable state, that is, is reset.

Assuming the core 203 to be originally in its reset condition, information may be stored in bit 201 by applying a positive voltage to terminal 236 and a negative voltage to terminal 238. The resulting current between terminals 236 and 238, through winding 212, causes the core 203 to be set. The readout of the information stored in the bit is accomplished by applying a negative signal to the base of one of the transistors 207, 227 or 228, and at the same time applying a voltage across the terminals 237. The particular transistor to which the signal is applied determines where the information is transferred.

The information stored in bit 1 of register I may be transferred to a corresponding bit in another register through either the information bus 246 or the arithmetic bus 247, depending on which bus the register to which the information is to be transferred is connected. As illustrated in the accompanying drawings, register II is shown as being connected to register I by both the information bus and the arithmetic bus. However, this is not the case with all the registers of the system, some being connected only to the information bus, and others being connected only to the arithmetic bus. When information is transferred out of a bit, it is temporarily stored in a transfer capacitance until the bit to which it is to be transferred is conditioned to receive it. Although shown as a separate capacitor in the drawings, in practice this capacitance is a part of its associated bus.

To transfer the information stored in bit 201 to another register via the information bus 246, a negative signal is applied to terminal 243. The signal is applied to the base of transistor 227 via winding 216, and tends to bias the transistor to conduction. However, it is not of sufficient strength to cause conduction in the transistor by itself. The application of a reset voltage to terminals 237 causes sufficient current to flow through winding 211 to switch the core 203 to its original or reset condition. By causing the core 203 to switch from a set condition to its reset condition a voltage will be induced in winding 216 which, taken together with the signal applied at terminal 243, is sufficient to bias the transistor 227 to conduction. The conduction of the transistor builds up a voltage in transfer capacitor 245, thus transferring the information in the core 203 to the capacitor. This information may now be transferred to a corresponding bit in another register, as mentioned above, or it may be read back into bit 201, or both. To read the information back into bit 201 a negative signal is applied to terminal 239, dropping the potential of line 251 so that capacitor 245 will discharge through winding 213 to set the core 203.

In a similar manner information may be transferred from bit 201 and stored in capacitor 249. This is accomplished by simultaneously applying a negative signal to terminal 244 and applying a reset voltage across terminals 237. The switching of core 203 from the set to the reset condition will induce in winding 217 a voltage which, taken with that of the signal at 244, will be sufficient to cause transistor 228 to conduct. This conduction will cause capacitor 249 to become charged. The charge on capacitor 249 may be either transferred to another register by means of arithmetic bus 249 or read back into bit 201. To read back the information into bit 201, a negative signal is applied to terminal 242 causing the capacitor to discharge through winding 215, setting the core 203.

In addition to being transferred to another register by way of a temporary storage capacitor, the information in bit 201 may be read out if desired. In this readout operation the information in the bit is first stored temporarily in capacitor 234. This is accomplished by applying a negative signal to terminal 253 simultaneously with the application of a reset voltage to terminals 237. The reset voltage switches the core 203 to the reset condition, inducing in winding 218 a voltage which, together with that applied at terminal 253, is great enough to cause transistor 207 to conduct. The conduction of transistor 207 causes capacitor 234 to become charged. Again, the information thus stored in the capacitor may either be read out of the bit, read back into the bit, or both. If the information is read out of the bit a signal will appear at terminal 255. If the information is to be restored to the core 203, a negative signal is applied to terminal 242, allowing the capacitor 234 to discharge through winding 215, setting the core.

Thus by the application of signals to the proper windings of the core 203, information can be stored in the core, can be read out, and can be transferred to a corresponding core in another register. It should be noted that in the event that a core is in a reset condition, the application of a reset signal to the terminals 237 will not cause the core to switch. In this event no voltage will be induced in windings 216, 217 or 218, and their associated transistors will not be able to conduct.

All the bits of register I are constructed in the same manner as bit 201, with corresponding elements performing similar functions. For example, in bit 202, which is also shown in detail, the reading in of information is accomplished by applying a positive signal to terminal 236 and a negative signal to terminal 257. The resultant current will cause the core of bit 202 to be set. The information thus stored in the core may be read out at terminal 263, or may be transferred to capacitors 259 or 261 by applying signals to the proper terminals in the same manner as was done in bit 201. Thus, information may be selectively stored in the bits of register I, which information may be read out or transferred to another register.

To transfer information from one register to another, for example, from register I to register II, the information is first stored in a capacitor as previously described. If for example, the information in bit 201 is to be transferred to its corresponding bit 201' by means of information bus 246, the information is first transferred to capacitor 245 in the manner previously described. It is to be noted that the bits of register II are constructed in the same manner as the bits of register I, corresponding elements performing corresponding functions. It should also be noted that no transfer capacitors are necessary for register II, the capacitor of register I being connected in parallel to and thus common with the corresponding bits of the various registers of the system. Thus, to transfer the information stored in capacitor 245 to register II, a negative pulse is applied to terminal 239'. This negative signal causes the condenser 245 to discharge through line 265 of register I, through the information bus 246, through line 265' of bit 201' and through winding 213', setting core 203'. If the information of bit 201 has been transferred to capacitor 245 of register I, it can be discharged through arithmetic bus 247 and through winding 214' to set bit 201' by the application of a negative signal to terminal 241'. In a similar manner, information can be transferred from the other bits of register I to their corresponding bits in register II via either bus 246 or 247. It should be noted that the information that is stored in a capacitor may be restored to the bit from which it was obtained at the same time that it is being transferred to another register. Thus, for example, information stored in capacitor 245 may be transferred to register II and also restored to bit 201 by the simultaneous application of signals to terminals 239 and 239'. This will cause current in both windings 213 and 213' which will set cores 203 and 203'. The same is true, of course, of information stored in capacitor 249, or in any of the other transfer capacitors of register I.

The information stored in all the bits of register I may be transferred to the corresponding bits or register II simultaneously. To accomplish this transformation by way of the information bus a negative signal is applied to terminal 243 and a reset voltage is applied to the terminals 237 of each bit. This will cause the information in bit 201 to be transferred to capacitor 245, the information in bit 202 to be transferred to capacitor 259 and so on across the top row of the register. The application of signals to the corresponding terminals in the other four rows of register I will cause the information in each bit of each row to be transferred to its corresponding capacitor. Application of the proper signal to all five rows simultaneously will cause all the bits to transfer their information to their corresponding capacitors simultaneously. By then applying the proper signals to terminals 239' and 237' of bit 201' of register II, and to the corresponding terminals of all the other bits of register II simultaneously, each capacitor of register I will transfer its information to its corresponding bit in register II. In a similar manner information can be transferred from register I to register II by means of the arithmetic bus 247.

Since the transfer capacitors connected to the information bus are common to all the registers on that bus, it is apparent that information may be transferred from any of these registers to any other register. In each transfer, moreover, the same capacitors which are shown in register I of the drawings are used for the temporary storage of the information. No other transfer capacitors are needed.

What is claimed is:

1. A data processing device having facilities for changing signals representing multi-digit information in a first code notation to signals representing multi-digit information in a second code notation including storage means to store the signals representing multi-digit information in the first code notation, a first register coupled to the storage means for receiving therefrom signals representing multi-digit information in the first code notation, a second register coupled to the first register, means coupled to the first and second registers for transferring the multi-digit signals representing information in the first code notation from the first register to the second register, means coupled to the second register for inserting other signals into the second register with the signals representing multi-digit information in the first code notation from the first register whereby the signals stored in the second register represent multi-digit information in the second code notation, said last named means including a circuit for generating signals representative of a nine and inserting such signals between each of the signals representing a digit transferred from the first register to the second register, said first register having a plurality of stages for storing the multi-digit information and one stage of this register being a sign stage used to store signals representative of a sign, and means coupled to the sign stage for sensing the signals representative of the sign and storing like signals in a selected digit position of the second register in place of the inserted signals representing a nine for that digit.

2. A data processing device having facilities for changing signals representing multi-digit information in a first code notation to signals representing multi-digit information in a second code notation including storage means to store the signals representing multi-digit information in the first code notation, a first register coupled to the storage means for receiving therefrom signals representing multi-digit information in the first code notation, a second register coupled to the first register, means coupled to the first and second registers for transferring the multi-digit signals representing information in the first code notation from the first register to the second register, means coupled to the second register for inserting other signals into the second register with the signals representing multi-digit information in the first code notation from the first register whereby the signals stored in the second register represent multi-digit information in the second code notation, said last named means including a circuit for generating signals representative of a nine and inserting such signals between each of the signals representing a digit transferred from the first register to the second register, said first register having a plurality of stages for storing the multi-digit information and one stage of this register being a sign stage used to store signals representative of a sign, means coupled to the sign state for sensing the signals representative of the sign and storing like signals in a selected digit position of the second register in place of the inserted signals representing a nine for that digit, and further including a circuit for generating signals representing a zero and inserting such signals between each of the signals representing a digit transferred from the first register to the second register to the left of the most significant digit in place of the signals representing a nine for each of these digits.

References Cited in the file of this patent

UNITED STATES PATENTS

| | | |
|---|---|---|
| 2,872,666 | Greenhalgh | Feb. 3, 1959 |
| 2,916,210 | Selmer | Dec. 8, 1959 |